E. G. CAMELINAT.
LAMP FOR VEHICLES AND THE LIKE.
APPLICATION FILED MAR. 31, 1919.
1,334,838.
Patented Mar. 23, 1920.
2 SHEETS—SHEET 1.
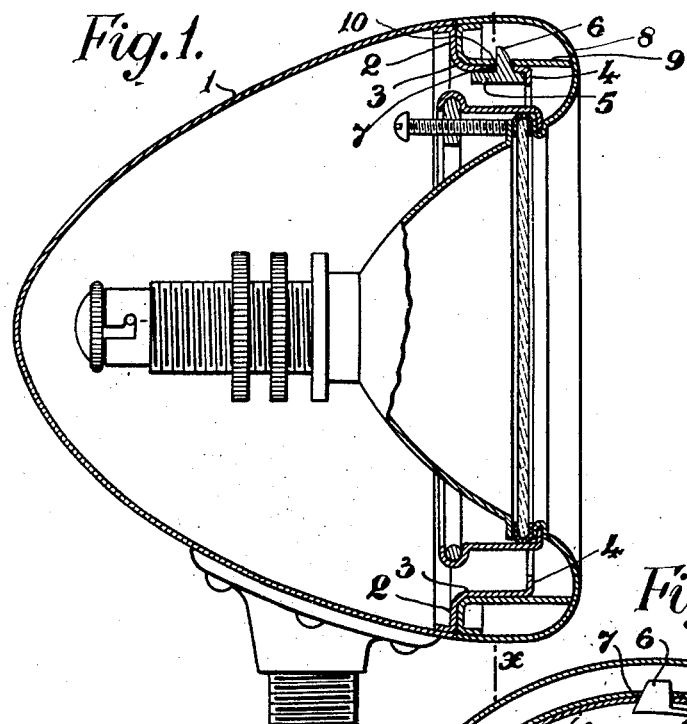
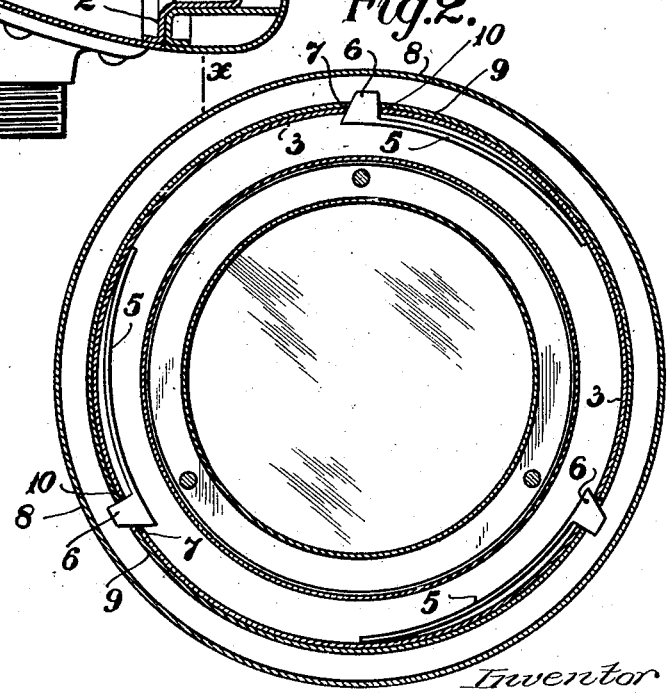

E. G. CAMELINAT.
LAMP FOR VEHICLES AND THE LIKE.
APPLICATION FILED MAR. 31, 1919.
1,334,838.
Patented Mar. 23, 1920.
2 SHEETS—SHEET 2.
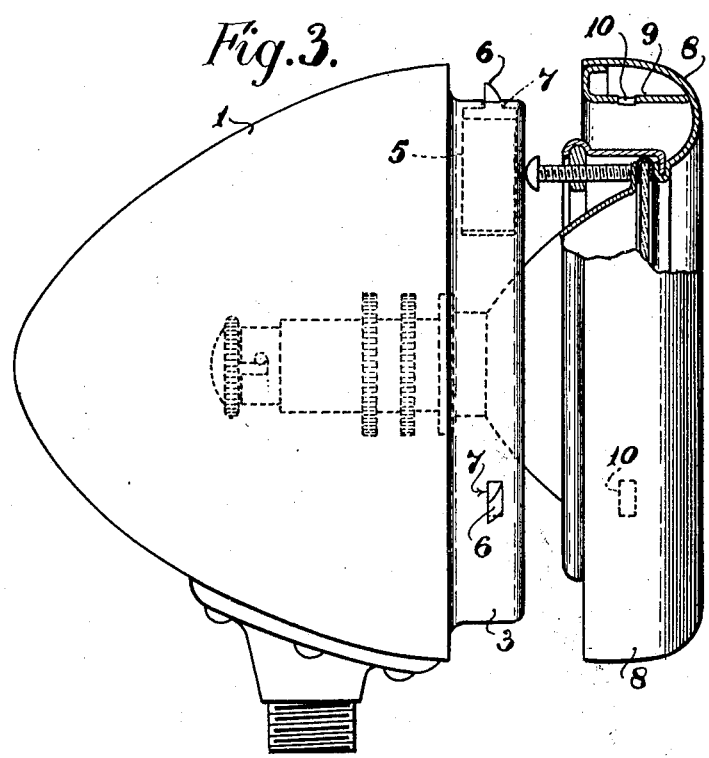

ically disposed to prevent tampering, as explained.

UNITED STATES PATENT OFFICE.

EUGENE GEORGE CAMELINAT, OF BIRMINGHAM, ENGLAND.

LAMP FOR VEHICLES AND THE LIKE.

1,334,838.   Specification of Letters Patent.   Patented Mar. 23, 1920.

Application filed March 31, 1919. Serial No. 286,518.

*To all whom it may concern:*

Be it known that I, EUGENE GEORGE CAMELINAT, citizen of France, residing at Birmingham, England, have invented certain new and useful Improvements in Lamps for Vehicles and the like, of which the following is a specification.

This invention relates to electric and other lamps of motor-cars, motor-cycles and other vehicles, aircraft and the like, said lamps being of that type in which the front rim carrying the glass is completely detachable from the body.

The object of the present invention is to provide improved and simplified means for securing the said detachable front to the body of the lamp.

According to the invention, secured to the front edge of the lamp body is a forwardly extending set-down annular flange or seating ring carrying a series of spring catch members which protrude through holes in the flange and engage within recesses or holes in an annular member fitted within the interior or back of the rim portion of the detachable front, said annular member being arranged to seat itself upon the set-down flange.

Figure 1 of the accompanying drawings is a vertical section through an electric motor-car lamp in which the front is detachably secured to the body in accordance with the present invention.

Fig. 2 represents a section through the catches, on line $x$, Fig. 1.

Fig. 3 shows the front of the lamp detached from the body, the said front being represented partly in section and the body in elevation.

Secured within the open front of the lamp body 1 is a sheet-metal ring 2 which is fashioned into a forwardly extending set-down flange or seating 3, the front edge being bent down in the form of a lip 4. Fixed to the inner periphery of the flange 3 are three or other suitable number of spring arms or tongues 5, arranged in the circumferential direction and secured at their one end by soldering, brazing, riveting or the like. The free ends of these spring tongues 5 carry upon their outer faces cam-like projections 6, constituting spring catches, which protrude through holes 7 in the cylindrical flange 3 said projections having their front faces and outer ends beveled or chamfered, but having their inner ends square with the tongues.

The rim portion 8 of the detachable front of the lamp is rolled over rearward to form a hollow back, and within the interior is secured an annular filling member 9 of angle section, giving a hollow box formation to the outer part of the ring. The horizontal portion of the angle-sectioned filling member 9 is arranged to slide over and seat itself upon the set-down flange 3 of the body, the outer end or corner being rounded in order more readily to depress the projections 6 of the spring arms; while at points corresponding to the positions of the said projections holes 10 are provided into which the projections are adapted to enter, thereby locking the front to the body.

When thus locked, the square inner faces of the catch projections 6 prevent any circumferential movement of the lamp front in one direction, but by rotating said front in the opposite direction the beveled ends of the catch projections act upon the edges of the slots 10 in order to cause the said projections to be depressed and to be disengaged from the slots, when the front can be detached from the body by a forward movement.

The front can be applied to the body in any position, the catches being depressed, and the front rotated until said catches snap into the slots 10.

Hemispherical catches or studs may be employed instead of the projections shown.

Having fully described my invention, what I desire to claim and secure by Letters Patent is:—

In lamps for vehicles and the like, the combination with a lamp body, of a forwardly extending offset flange at the front of the body, a series of circumferentially disposed spring tongues each fixed at one end to the inner periphery of the offset flange, catch projections carried by the free ends of said tongues and protruding through holes in the flange, and a detachable lamp front the rim portion of which is provided with an annular member adapted to seat itself upon the flange of the body and having recesses to receive the spring catch projections, said catch projections being so formed as to provide at one end a square shoulder and having the front face and other end beveled whereby the lamp front may be pressed to locked position and rotation in one direction will depress said catches and release the front from locking engagement.

In testimony whereof I have hereunto set my hand in presence of two subscribing witnesses.

EUGENE GEORGE CAMELINAT.

Witnesses:
M. N. SKERRITT,
H. O. PRATT.